(12) United States Patent
Huang

(10) Patent No.: US 9,002,330 B2
(45) Date of Patent: Apr. 7, 2015

(54) SYSTEM AND MOBILE PHONE FOR DETERMINING USING STATE OF OTHER MOBILE PHONES

(75) Inventor: Ren-Wen Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 169 days.

(21) Appl. No.: 13/553,834

(22) Filed: Jul. 20, 2012

(65) Prior Publication Data
US 2013/0165082 A1  Jun. 27, 2013

(30) Foreign Application Priority Data
Dec. 27, 2011 (CN) .......................... 2011 1 0444418

(51) Int. Cl.
*H04Q 7/00* (2006.01)
*H04W 8/24* (2009.01)
*H04W 8/20* (2009.01)

(52) U.S. Cl.
CPC .. *H04W 8/24* (2013.01); *H04W 8/20* (2013.01)

(58) Field of Classification Search
USPC ........ 455/414.1, 418, 566, 412.2, 414.4, 419, 455/420
See application file for complete search history.

(56) References Cited

U.S. PATENT DOCUMENTS

| | | | |
|---|---|---|---|
| 8,000,748 B2 * | 8/2011 | Lee et al. | 455/566 |
| 8,538,459 B2 * | 9/2013 | Choi et al. | 455/456.3 |
| 2010/0217809 A1 * | 8/2010 | Vymenets et al. | 709/206 |
| 2011/0269439 A1 * | 11/2011 | Griffin | 455/415 |
| 2013/0217364 A1 * | 8/2013 | Varoglu et al. | 455/414.1 |

* cited by examiner

*Primary Examiner* — Ajit Patel
*Assistant Examiner* — Julio Perez
(74) *Attorney, Agent, or Firm* — Novak Druce Connolly Bove + Quigg LLP

(57) ABSTRACT

An exemplary mobile phone is for determining a using state of each of other mobile phones communicatively connected with the mobile phone. The mobile phone includes a first communicating unit, a power switch, a using state determining unit, a second communicating unit, and a control unit. The using state determining unit determines the using state of the mobile phone by monitoring the first communicating unit and the power switch. The control unit controls the second communicating unit to transmit a contact ID and the using state of the mobile phone to a mobile switching center (MSC) via a base station (BS). Each one of the other mobile phones obtains the using state of the mobile phone from the MSC by transmitting the contact ID of the mobile phone via the BS, and updates the using state of the contact ID in the address list with the obtained using state.

13 Claims, 3 Drawing Sheets

| Address list | |
|---|---|
| Contact ID | Using state |
| Charles | Free |
| Mandy | Busy |
| Miles | Power off |

FIG. 3

SYSTEM AND MOBILE PHONE FOR DETERMINING USING STATE OF OTHER MOBILE PHONES

BACKGROUND

1. Technical Field

The present disclosure relates to mobile communication technology, and particularly to a system and a mobile phone for determining a using state of one or more other mobile phones.

2. Description of the Related Art

Generally, mobile phones have four using states, namely a free state, a busy state, a power off state, and an out of service state. The free state of the mobile phone represents when the mobile phone is powered on but is not being used in a call. The busy state represents when the mobile phone is powered on and is being used in a call. The power off state represents when the mobile phone is powered off. The out of service state represents when the mobile phone is powered on but is not able to be used in a call at all, such as when the mobile phone can not communicate with a base station (BS) because the mobile phone is in an enclosed place.

When a caller makes a call to a mobile phone and the mobile phone is in the busy state, the power off state or the out of service state, the caller may simply have wasted his/her time. What is needed is a means to overcome these problems.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

FIG. 3 is a schematic view showing a user interface provided by one of the mobile phones of the system of FIG. 1, in accordance with an exemplary embodiment.

DETAILED DESCRIPTION

Figure 1:
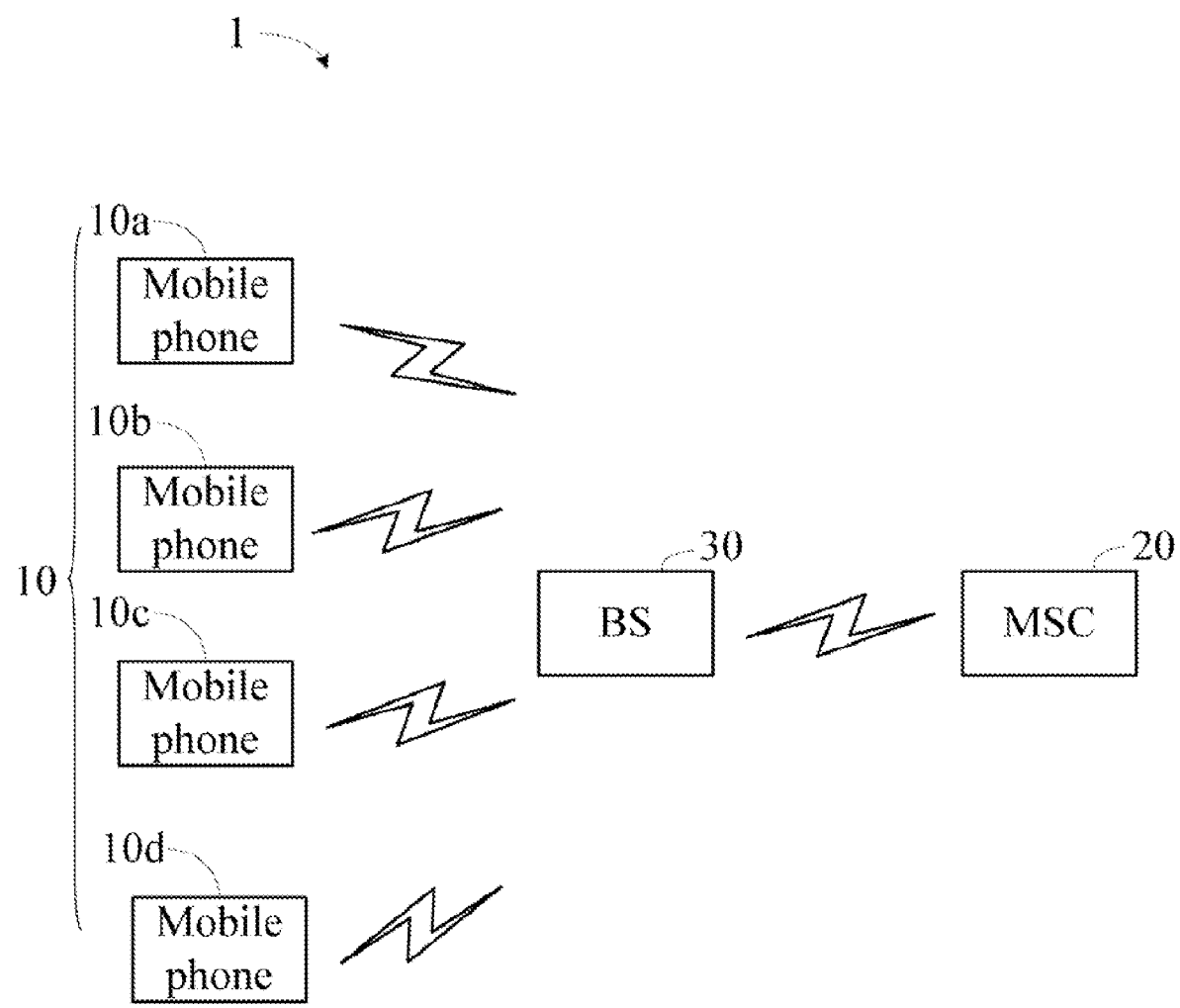
FIG. 1 is a schematic diagram of a system for determining using states of a plurality of mobile phones, in accordance with an exemplary embodiment.

FIG. 1 is a schematic diagram of a system for determining using states of a plurality of mobile phones, in accordance with an exemplary embodiment. The system 1 includes a plurality of mobile phones 10 communicatively connected with a mobile switching center (MSC) 20 via a base station (BS) 30. The mobile phones 10a-10d communicate with each other via the BS 30.

Figure 2:
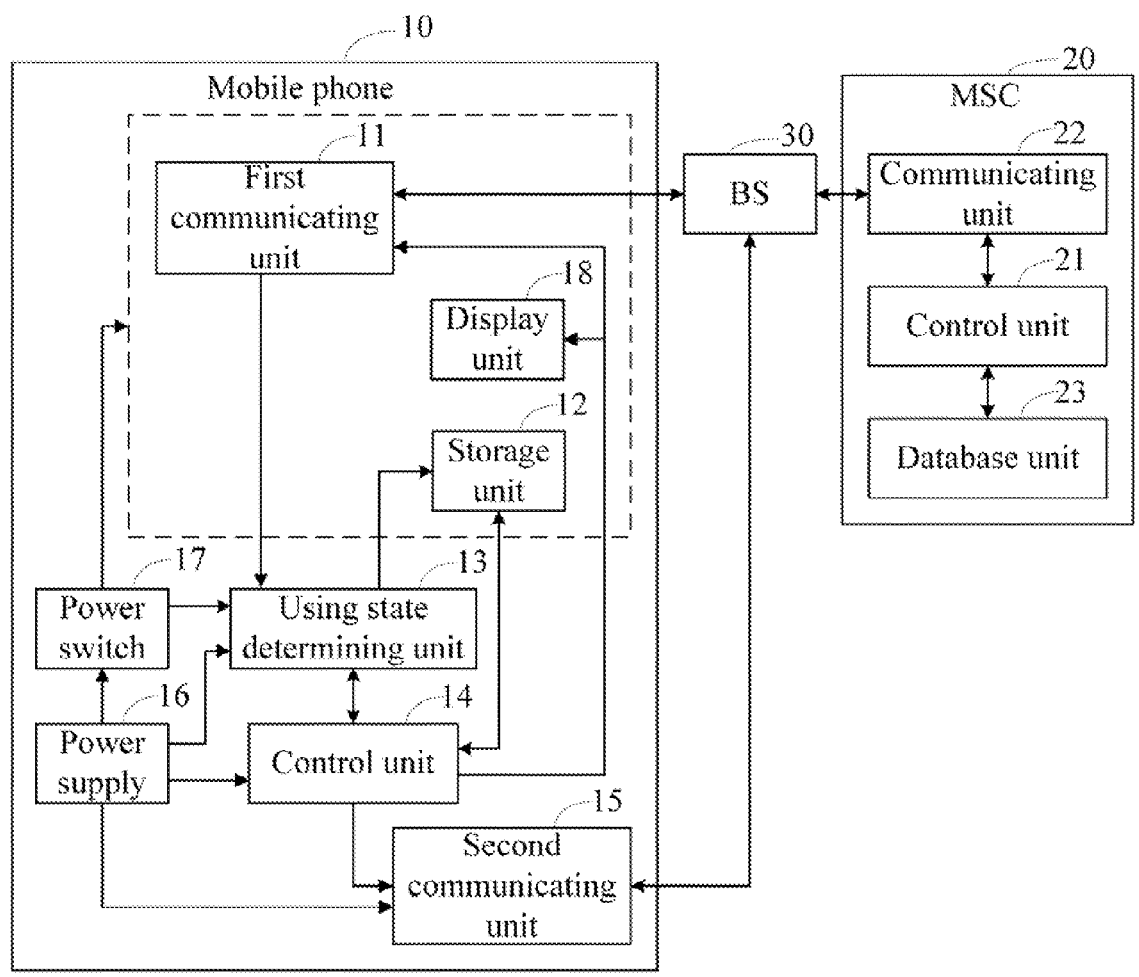
FIG. 2 is a detailed block diagram of part of the system of FIG. 1.

Referring also to FIG. 2, each mobile phone 10 includes a first communicating unit 11, a storage unit 12, a using state determining unit 13, a control unit 14, a second communicating unit 15, a power supply 16, a power switch 17, and a display unit 18. The power supply 16 is directly connected to the using state determining unit 13, the control unit 14, and the second communicating unit 15. The other units excepting the using state determining unit 13, the control unit 14, and the first communicating unit 11 are connected to the power supply through the power switch 17. If the power switch 17 is turned on in response to a user's operation, the power supply 16 powers the mobile phone 10 including all the above-mentioned units. If the power switch 17 is turned off in response to a user's operation, the power supply 16 only powers the second communicating unit 15, the using state determining unit 13, and the control unit 14.

Taking the mobile phone 10a as an example, the storage unit 12 stores an address list including information on contacts. The information on contacts includes information on the user of the mobile phone 10a and a number of contacts of the user of the mobile phone 10a. In the embodiment, each item of contact information includes a contact identification (ID) and a current using state of a respective one of the mobile phones 10a-10d. The contact ID is for identifying the mobile phone 10 of the contact, and may be a user name, a telephone number, and so on. The using states of the mobile phones 10a-10d include a free state, a busy state, a power off state, an out of service state, and so on. The first communicating unit 11 is configured for communicating with another mobile phone 10b-10d via the BS 30 if the user of the mobile phone 10a is undergoing a telephone call when the mobile phone 10 is powered on. The using state determining unit 13 periodically determines the using state of the mobile phone 10 by monitoring the first communicating unit 11 and the power switch 17.

For example, the using state determining unit 13 determines that the using state of the mobile phone 10a is the free state if the power switch 17 is turned on and the first communicating unit 11 can communicate with the BS 30 only for a limited period of time. The using state determining unit 13 determines that the using state of the mobile phone 10a is the busy state if the power switch 17 is turned on and the first communicating unit 15 communicates with another mobile phone 10b-10d via the BS 30 for a period of time. The using state determining unit 13 determines that the using state of the mobile phone 10a is the power off state if the power switch 17 is turned off. The using state determining unit 13 determines that the using state of the mobile phone 10a is the out of service state if the power switch 17 is turned on and the first communicating unit 11 can not communicate with the BS 30 for any period of time at all, such as when the first communicating unit 11 or the BS 30 is malfunctioning.

The second communicating unit 15 is configured for communicating with the MSC 20 via the BS 30. The control unit 14 obtains the using state of the mobile phone 10a determined by the using state determining unit 13, and controls the second communicating unit 15 to transmit a communication signal containing the contact ID and the using state of the mobile phone 10a to the MSC 20 via the BS 30. In the embodiment, the control unit 14 controls the second communicating unit 15 to transmit the communication signal to the MSC 20 via the BS 30 only when a current using state determined by the using state determining unit 13 is different from a previous using state determined by the using state determining unit 13 last time.

The MSC 20 includes a control unit 21, a communicating unit 22, and a database unit 23. The database unit 23 includes a number of items of user information of the mobile phones 10a-10d. In the embodiment, each item of user information includes a contact ID such as a user name or a telephone number, and a using state of the respective mobile phone 10. Taking the mobile phone 10a as an example, the control unit 21 receives the communication signal transmitted by the mobile phone 10a via the communicating unit 22, analyzes the communication signal to determine the contact ID and the using state contained in the communication signal, and updates the using state of the corresponding item of user information in the database unit 23 according to the contact ID and the using state contained in the communication signal.

Taking the mobile phone 10a as an example, the mobile phone 10a further pre-stores the using states of the mobile phones 10*b*-10*d*, whose contact information is stored in the address list of the mobile phone 10*a*. In the embodiment, the control unit 14 of the mobile phone 10*a* periodically controls the second communicating unit 15 to transmit a communication signal containing the contact IDs of the mobile phones 10*b*-10*d* to the MSC 20 via the BS 30. The control unit 21 of the MSC 20 analyzes the communication signal to determine the contact IDs, and determines the using states of the mobile phones 10*b*-10*d* corresponding to the determined contact IDs from the corresponding items of user information in the database unit 23. Then the control unit 21 of the MSC 20 controls the communicating unit 22 to transmit the contact IDs and the corresponding using states of the mobile phones 10*b*-10*d* to the mobile phone 10*a*. The mobile phone 10*a* receives the contact IDs and the corresponding using states transmitted by the MSC 20 via the second communicating unit 15. The using state determining unit 13 of the mobile phone 10*a* updates the using states of the contact IDs in the address list stored in the storage unit 12 with the using states of the mobile phones 10*b*-10*d* transmitted from the MSC 20.

Referring to FIG. 3, this shows an exemplary user interface provided by the display unit 18 of any of the mobile phones 10. Taking the mobile phone 10*a* as an example, the user interface displays the using states of a plurality of contacts in the address list stored in the mobile phone 10*a*. The control unit 14 of the mobile phone 10*a* controls the displaying of the using states of the contact IDs of the mobile phones 10*b*-10*d* on the display unit 18 when the address list is opened. For example, if the using states of the mobile phones 10*b*-10*d* respectively are the free state, the busy state, and the power off state, and the contact IDs of the mobile phones 10*b*-10*d* respectively are "Charles," "Mandy," and "Miles," then when the address list is opened, the control unit 14 of the mobile phone 10*a* displays each contact ID and the corresponding using state of each contact ID on the display unit 18, as seen in FIG. 3. Thereby, the user of the mobile phone 10*a* can know the using states of the mobile phones 10*b*-10*d* listed in the address list, and can decide whether to make a call and who to call among the mobile phones 10*b*-10*d* according to the using states.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A system for determining a using state of each of a plurality of mobile phones, the system comprising:
a mobile switching center (MSC); and a plurality of mobile phones configured for communicating with the MSC via a base station (BS), and for communicating with each other via the BS, wherein each mobile phone comprises:
a storage unit configured for storing an address list including information on contacts, wherein each item of contact information includes a contact identification (ID) and a current using state of a respective one of the mobile phones;
a first communicating unit configured for communicating with any selected one of the plurality of mobile phones via the BS by way of telephone call; a power switch connected to the storage unit and the first communicating unit, and configured for being turned on and off alternatively in response to a user's operation, to continue and discontinue a power supply connected to the power switch and used to power the storage unit and the first communicating unit;
a using state determining unit configured for determining the using state of the mobile phone by monitoring the first communicating unit and the power switch; a second communicating unit configured for communicating with the MSC via the BS; and a control unit configured for: obtaining the using state of the mobile phone determined by the using state determining unit and controlling the second communicating unit to transmit the contact ID and the obtained using state of the mobile phone to the MSC via the BS; and controlling the second communicating unit to transmit the contact IDs of the plurality of mobile phones in the address list to the MSC via the BS to obtain the using states of the plurality of mobile phones corresponding to the contact IDs stored in the MSC;
wherein the using state determining unit is further configured for updating the using states of the contact IDs of the plurality of mobile phones in the address list with the using states obtained from the MSC by the control unit;
wherein the MSC stores user information of the mobile phones, each item of user information includes a contact ID and a current using state of a respective one of the mobile phones, and the MSC is configured for updating the current using state of each of the mobile phones with the using state transmitted by the mobile phone having the corresponding contact ID.

2. The system as recited in claim 1, wherein the using state determining unit, the second communicating unit and the control unit are connected to the power supply directly.

3. The system as recited in claim 1, wherein the contact IDs are used for identifying the mobile phones of the contacts, and comprise a user name and a telephone number; and the using states of the mobile phones comprise a free state, a busy state, a power off state, and an out of service state.

4. The system as recited in claim 1, wherein the control unit controls the second communicating unit to transmit the contact ID and the using state of the mobile phone to the MSC when a current using state determined by the using state determining unit is different from a previous using state determined by the using state determining unit last time.

5. The system as recited in claim 1, wherein each mobile phone further comprises a display unit configured for displaying the current using states of the contact IDs in the address list.

6. A mobile phone for determining a using state of each of a plurality of other mobile phones;
wherein the mobile phone is configured for communicating with a mobile switching center (MSC) and with the other mobile phones via a base station (BS); and the mobile phone comprises:
a storage unit configured for storing an address list including information on contacts, wherein each item of contact information includes a contact identification (ID) and a current using state of a respective one of the mobile phones; a first communicating unit configured for communicating with any selected one of the other mobile phones via the BS by way of telephone call;
a power switch connected to the storage unit and the first communicating unit, and configured for being turned on and off alternatively in response to a user's operation, to continue and discontinue a power supply connected to the power switch and used to power the storage unit and the first communicating unit;
a using state determining unit configured for determining the using state of the mobile phone by monitoring the first communicating unit and the power switch; a second communicating unit configured for communicating with the MSC via the BS; and a control unit configured for:

obtaining the using state of the mobile phone determined by the using state determining unit and controlling the second communicating unit to transmit the contact ID and the obtained using state of the mobile phone to the MSC via the BS;

and controlling the second communicating unit to transmit the contact IDs of the other mobile phones in the address list to the MSC via the BS to obtain the using states of the other mobile phones corresponding to the contact IDs from the MSC;

wherein the using state determining unit is further configured for updating the using states of the contact IDs of the other mobile phones in the address list with the using states obtained from the MSC by the control unit;

wherein the control unit controls the second communicating unit to transmit the contact ID and the using state of the mobile phone to the MSC when a current using state determined by the using state determining unit is different from a previous using state determined by the using state determining unit last time.

7. The mobile phone as recited in claim 6, wherein the using state determining unit, the second communicating unit, and the control unit are connected to the power supply directly.

8. The mobile phone as recited in claim 6, wherein the contact IDs are used for identifying the mobile phones of the contacts, and comprise a user name and a telephone number; the using states of the mobile phones comprise a free state, a busy state, a power off state, and an out of service state.

9. The mobile phone as recited in claim 6, wherein each mobile phone further comprising a display unit configured for displaying the current using states of the contact IDs in the address list.

10. A mobile phone for determining a using state of each of a plurality of other mobile phones;

wherein the mobile phone is configured for communicating with a mobile switching center (MSC) and with the other mobile phones via a base station (BS); and the mobile phone comprises:

an address list including a contact identification ID and a current using state of each of the mobile phones;

a first communicating unit configured for communicating with any selected one of the other mobile phones via the BS by way of telephone call;

a power switch connected to the first communicating unit, and configured for being turned on and off alternatively in response to a user's operation, to continue and discontinue a power supply connected to the power switch and used to power the first communicating unit;

a using state determining unit configured for determining the using state of the mobile phone by monitoring the first communicating unit and the power switch; a second communicating unit configured for communicating with the MSC via the BS; and a control unit configured for:

obtaining the using state of the mobile phone determined by the using state determining unit and controlling the second communicating unit to transmit a contact identification (ID) and the obtained using state of the mobile phone to the MSC via the BS; and controlling the second communicating unit to transmit the contact IDs of the other mobile phones in the address list to the MSC via the BS to obtain the using states of the other mobile phones corresponding to the contact IDs from the MSC;

wherein the using state determining unit is further configured for updating the using states of the contact IDs of the other mobile phones in the address list with the using states obtained from the MSC by the control unit;

wherein the control unit controls the second communicating unit to transmit the contact ID and the using state of the mobile phone to the MSC when a current using state determined by the using state determining unit is different from a previous using state determined by the using state determining unit last time.

11. The mobile phone as recited in claim 10, wherein the using state determining unit, the second communicating unit, and the control unit are connected to the power supply directly.

12. The mobile phone as recited in claim 10, wherein the contact IDs are used for identifying the mobile phones of the contacts, and comprise a user name and a telephone number; the using states of the mobile phones comprise a free state, a busy state, a power off state, and an out of service state.

13. The mobile phone as recited in claim 10, wherein each mobile phone further comprising a display unit configured for displaying the current using states of the contact IDs in the address list.

* * * * *